S. J. GULESIAN.
ADJUSTABLE RAIL FITTING.
APPLICATION FILED APR. 15, 1916.
1,304,561.
Patented May 27, 1919.
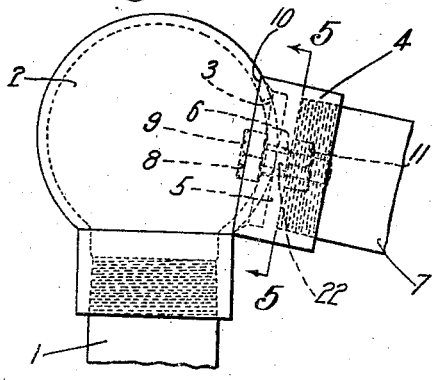
Fig. 1
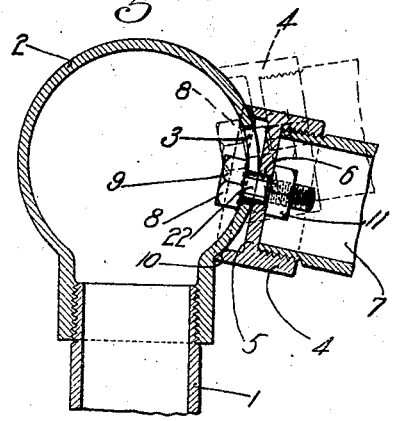
Fig. 2.
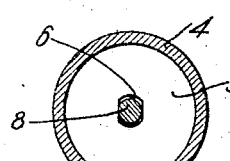
Fig. 5.
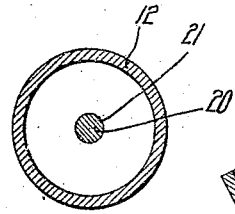
Fig. 6.
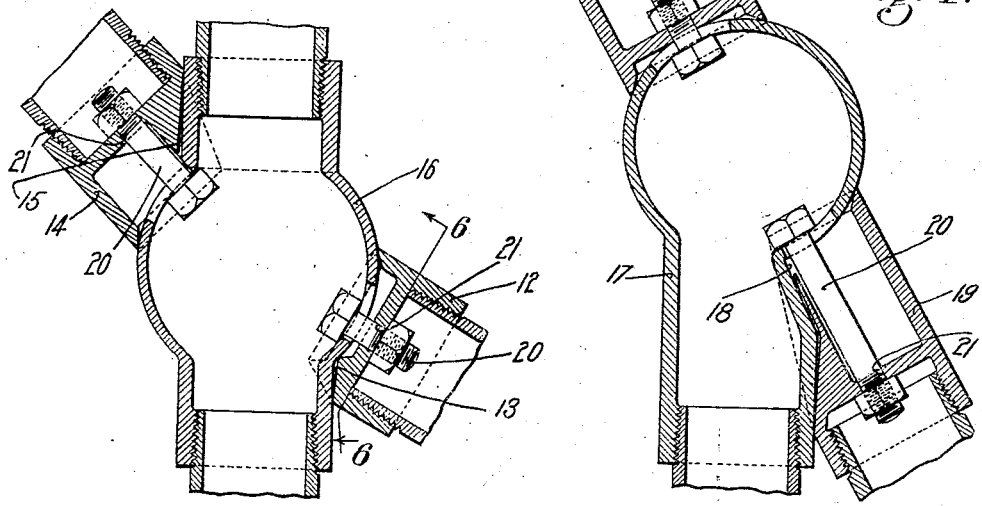
Fig. 3.
Fig. 4.
Inventor
Selden J. Gulesian
by Chas. F. Perkins Atty

UNITED STATES PATENT OFFICE.

SELDEN J. GULESIAN, OF BOSTON, MASSACHUSETTS.

ADJUSTABLE RAIL-FITTING.

1,304,561.     Specification of Letters Patent.     Patented May 27, 1919.

Application filed April 15, 1916. Serial No. 91,310.

*To all whom it may concern:*

Be it known that I, SELDEN J. GULESIAN, a citizen of the United States, residing in that part of Boston called Hyde Park, in the county of Suffolk and State of Massachusetts, have invented new and useful Improvements in Adjustable Rail-Fittings, of which the following is a specification.

My invention relates to rail fittings and its object is to provide a simple and inexpensive adjustable means for connecting pipe rails to form stairway balustrades and the like.

An important result due to novel features of my improved means is the ability to obtain any angle required in practice between the upright or supporting member and the intermediate rails.

A further advantage resides in the adjustable character of the various types of fittings embodying my invention, enabling variations in the angle extending over an arc of five degrees or more without structural alterations.

My new and improved connection consists essentially of a stanchion or other supporting member provided with a hollow spherical cap slotted to receive a bolt shank, a collar adapted to receive a pipe rail and provided with a cross piece apertured to receive the bolt shank, a bolt engaging the slot in the cap and the aperture in the cross piece, and a nut engaging the screw threaded end of the bolt shank. The slots are located, and the collars and stanchions hereinafter described are constructed, to meet in general the requirements of a particular specification, but permit of a variation in the contemplated angle within an arc of approximately five to twenty degrees. This latitude of adjustment is of great utility in correcting inaccuracies and mistakes in specification, facilitating alterations in construction and greatly reduces the number of types of cap and collar necessarily kept in stock to comprehend the entire range of demand. The edge of the collar opening which contacts with the spherical cap is preferably beveled to an angle slightly more acute than a close fit angle, thus simplifying the machining off operation to insure a clean joint. The sharper edge thus obtained also tends to "bite" the cap surface and coöperates with the bolt head corners, which similarly bite the interior surface of the cap at the points of contact, to prevent rotation of the collar when the pipe rail end is screwed in, thus facilitating the assembling of the parts.

In the accompanying drawing in which like numerals of reference indicate corresponding parts in the various figures thereof, Figure 1 is a front elevation of a stanchion and fitting embodying my invention. Fig. 2 is a longitudinal section of the same. Fig. 3 is a longitudinal section of a "cross" showing two types of the modified form of collar fitting embodying my invention. Fig. 4 is a longitudinal section of a T showing still another type of modified form of collar fitting and a modified form of stanchion. Fig. 5 is a section on line 5—5 of Fig. 1. Fig. 6 is a section on line 6—6 of Fig. 3.

1 is the stanchion or upright support provided with the spherical cap 2. 3 is the slot therein. Two or more slots may be provided according to the number of pipe rails to be connected therewith. 4 is the interiorily screw threaded collar provided with the cross piece 5, having therein a central aperture 6. The long dimension of the slot should be substantially less than the diameter of the collar in order to avoid exposing the slot when the collar is moved to vary the angle as shown by the dotted lines in Fig. 2. 7 is a pipe rail screw threaded at its extremity to engage the collar 4. 8 is the bolt of the form shown in Fig. 5, adapted to engage at its polygonal portion 22 the aperture 6, and also to engage the slot 3, provided with the hexagonal bolt head 9, the corners of which engage the interior surface of the cap 2 and tend to prevent rotation of the collar 4, in the performance of which function assistance is rendered by the sharp collar edge 10. Said sharp edge is provided by beveling the inner surface of the edge to such a degree that the beveled portion will stand at an angle to the curvature of the cap 2, and thereby provide a knife edge capable of making a non-slip engagement with the surface of the cap. Said edge engages the surface of cap 2 at an acute angle so as to bite into said surface and prevent relative rotation. 11 is the nut adapted to engage the screw threaded end of the bolt 8. In Figs. 3, 4 and 6, a bolt 20 having a circular cross section engaging an annular aperture 21 is shown, but the polygonal type of bolt and aperture shown in Fig. 5 is more effective to prevent rotation of the collar in assembling and is preferred. 12 in Fig. 3 indicates a modified form of collar adapted to use when the required angle is less than eighty degrees, the periphery of which is sheared away at 13, and 14 is another type of the modified form sheared to a greater extent at 15. A different form of stanchion adapted to form a "cross" is also shown in Fig. 3 and indicated by the numeral 16. 17 in Fig. 4 indicates a modified form of stanchion cut away at 18 and adapted to be combined with a collar 19 of the form shown in Fig. 3 but sheared to a greater extent than the specific types there shown, to obtain still more acute angles. Five types of collar of the form shown in Fig. 3 sheared in different degrees, together with the form shown in Fig. 1, and the two forms of stanchion shown will comprehend the entire range of angles required in practical commercial usage and provide in all cases a neat joint, the assembling mechanism of which is completely concealed. The form of collar shown in Fig. 1 is adapted to angles of from eighty degrees to one hundred eighty degrees for elbows, and from eighty degrees to one hundred degrees for T's and crosses; collars of the form shown in Figs. 3 and 4 are preferably constructed in five types, as follows:—sheared at an angle of one hundred twenty degrees with the collar end, adapted to angles of from sixty to eighty degrees; sheared at an angle of one hundred twelve degrees with the collar end, adapted to angles of from forty-five to sixty degrees; sheared at an angle of one hundred ten degrees with the collar end, adapted to angles of from forty to forty-five degrees; sheared at an angle of one hundred seven degrees with the collar end, adapted to angles of from thirty-five to forty degrees; sheared at an angle of ninety-seven degrees with the collar end adapted to angles of from thirty to thirty-five degrees.

The form of stanchion shown in Fig. 1 is adapted to angles of from forty-five to one hundred eighty degrees; that shown in Fig. 4 is adapted to angles of from thirty to forty-five degrees. Two types of stanchion of the form shown in Fig. 4 cut away in different degrees, together with the form shown in Figs. 1 and 2, will cover the range of angular demand when combined with the appropriate form and type of collar.

What I claim and desire to secure by Letters Patent is:

1. An adjustable pipe rail fitting comprising a hollow spherical member provided with a slot, a collar adapted to receive a pipe end and provided with a closs piece having a central aperture therein, a bolt adapted to engage said slot and said aperture to limit the movement of said collar by contact with either extremity of the slot, said collar being of sufficiently greater exterior diameter than the long dimension of said slot to prevent exposure of the slot irrespective of the relative angle of the collar and spherical member.

2. A pipe rail fitting comprising a hollow spherical member provided with an opening, a collar having an edge complemental to the spherical member and having its inner surface beveled at an angle to the surface of said spherical member to provide a thin angular biting edge capable of close engagement with said surface, said collar being provided with a cross piece having a central aperture therein, a headed bolt adapted to engage said aperture and a nut adapted to engage the bolt to retain said spherical member and said collar in a predetermined relation to each other.

3. An adjustable pipe rail fitting comprising a hollow spherical member provided with a slot, a collar adapted to receive a pipe end and provided with a cross piece having a central aperture therein, a bolt adapted to engage said slot and said aperture to limit the movement of said collar by contact with either extremity of the slot, said collar being of sufficiently greater exterior diameter than the long dimension of said slot to prevent exposure of the slot irrespective of the relative angle of the collar and spherical member, said collar having an edge complemental to the surface of said spherical member, the inner surface of said edge being beveled at an angle to the surface of said spherical member to form a biting edge capable of engaging the surface of said spherical member.

In testimony whereof I have hereunto set my hand this thirteenth day of April, 1916.

SELDEN J. GULESIAN.